May 23, 1967   L. S. TAYLOR ET AL   3,320,813
REMOVABLE GAUGE HEAD COVER
Filed July 6, 1965   2 Sheets-Sheet 2

INVENTORS.
LETA S. TAYLOR
PAUL B. JOHNSON
EUGENE D. HUSKEY

BY
ATTORNEY.

3,320,813
    REMOVABLE GAUGE HEAD COVER
Leta S. Taylor, Paul B. Johnson, and Eugene D. Huskey,
  all of Garland, Tex., assignors to J. Y. Taylor Mfg.
  Company, a corporation of Texas
        Filed July 6, 1965, Ser. No. 469,723
             2 Claims. (Cl. 73—431)

This invention relates to new and useful improvements in liquid level gauges and the like and has particular reference to the provision of a new and improved liquid level gauge head cover which is particularly adapted for affording protection to the gauge head of the gauge and yet is readily and speedily removable therefrom.

An object of the present invention is to provide a new and improved gauge head cover for a liquid level gauge, which head cover is particularly adapted to be utilized thereon such as to afford protection to the gauge head and which is quickly and easily removable therefrom.

Another object of the present invention is to provide a new and improved gauge head cover of the type set forth which is particularly adapted to be utilized such as to provide a protective covering for the gauge head during shipment and/or use of the gauge and which has removable portions for removing the cover from the gauge head and for viewing the gauge dial.

Another object of the invention is to provide a new and improved gauge head cover of the type set forth which is particularly adapted to serve as a paint protector for the gauge head during the painting of the gauge and which can be easily and quickly removed after the painting.

Another object is to provide a new and improved gauge head cover of the type set forth which is adapted to serve to retain the gauge head mounting bolts in their proper mounting positions on the gauge head until the gauge head is mounted on the tank mounting.

Another object is to provide a new and improved gauge head cover of the type set forth which allows ready and simple access to the gauge head bolts, and yet serves to provide said protective covering for said gauge head.

Another object is to provide a new and improved gauge head cover of the type set forth which is readily and speedily removable from the gauge head such that it may be installed thereupon or removed therefrom as desired.

Other objects and advantages of the invention will be apparent from the following description taken in connection with the accompanying drawings. It will be understood that changes may be made in the details of construction and arrangement of parts shown and described as the preferred forms of the invention have been given by way of illustration only.

Referring to the drawings.

Figure 1:
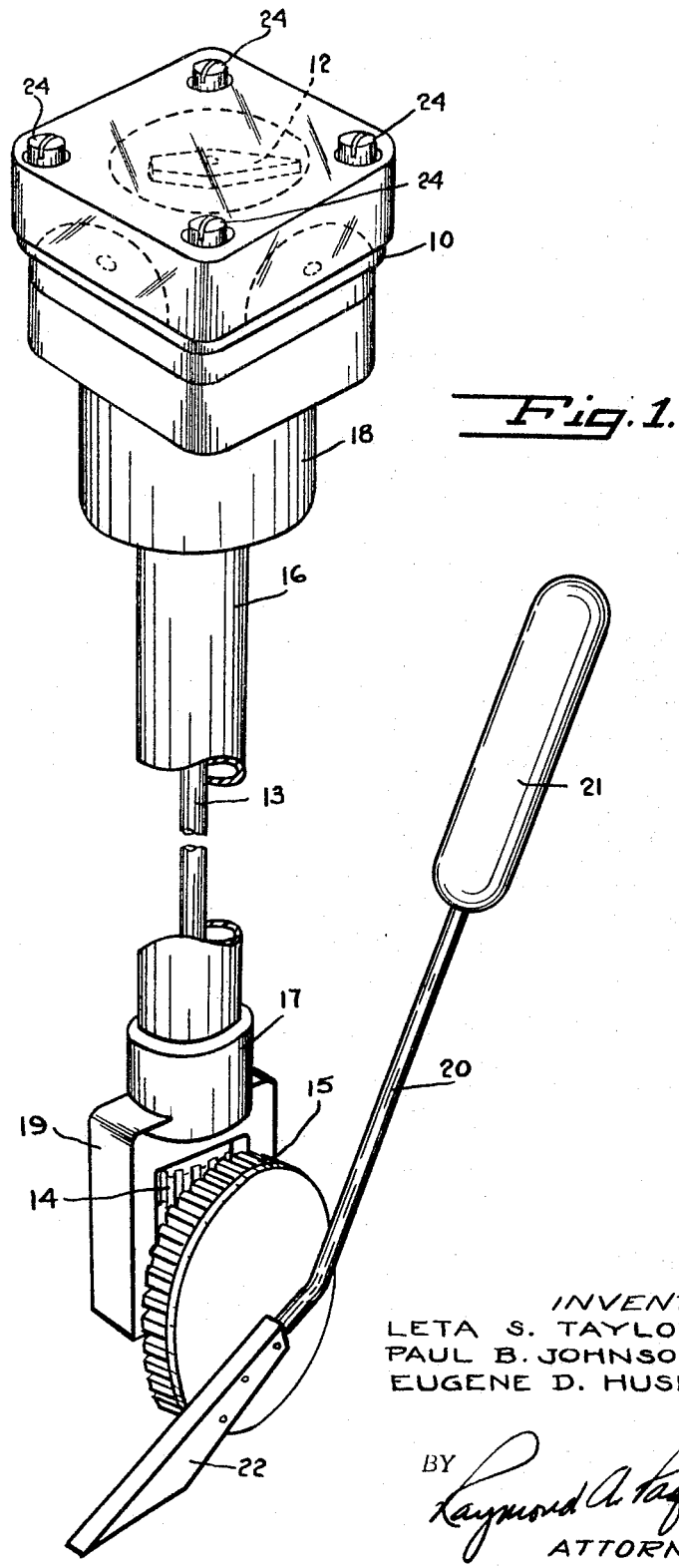
FIG. 1 is a perspective view illustrating a liquid level gauge embodying the present invention.

Referring more particularly to the drawings wherein similar reference characters designate corresponding parts throughout the several views, and with particular reference to FIG. 1, in said figure a gauge head cover constructed according to the present invention is illustrated with respect to a liquid level gauge of a certain, specific construction. It will be understood, however, that the form of liquid level gauge illustrated in the drawings has been therein shown for the purposes of illustration only; and the gauge head cover of the present invention is equally well applicable to liquid level gauges and other gauges of construction and design other than that illustrated in FIG. 1 of the drawings.

The form of liquid level gauge illustrated in FIG. 1 comprises a gauge head which is designated generally at 10 having a gauge face 11 which is in the form of a scale or dial and is operatively associated with the pointer or indicator 12 such that the position of said indicator 12 on said scale or dial 11 indicates the level of the liquid in the tank or other container accompanied by the gauge.

Gauge head 10, furthermore, is operatively connected to a rod or shaft 13 which has a pivotable magnet at its upper end for actuating indicator 12 and its opposite end is operatively connected to gear member 14 which meshes with gear member 15, said rod or shaft 13 being enclosed within the cylinder or tubular member 16 which is secured at its opposite ends to a flange 18 on the lower end of said gauge head 10 and a flange 17 on the upper end of the pivot fork 19. Said gear member 14 is positioned within said pivot fork 19; and gear member 15 is pivotally connected to said fork 19.

Said gear member 15 carries float rod 20, the opposite ends of said shaft serving to carry a float 21 and a counterweight 22 such that relative movements of said float 21 and said counterweight 22 to one another indicate the level of liquid in the tank container being measured to the indicator 12 on the face of gauge head 10 through the gear members 14 and 15, shaft 13, and associated mechanism.

Referring more particularly to the form of gauge head 10 illustrated in FIG. 1, such is provided with a series of holes or openings 23 through which the gauge head mounting bolts 24 are positioned such as to operatively secure said gauge head to the remainder of the gauge. Said gauge head 10, furthermore, includes indentures or recesses 10a in its opposite sides.

Figure 2:
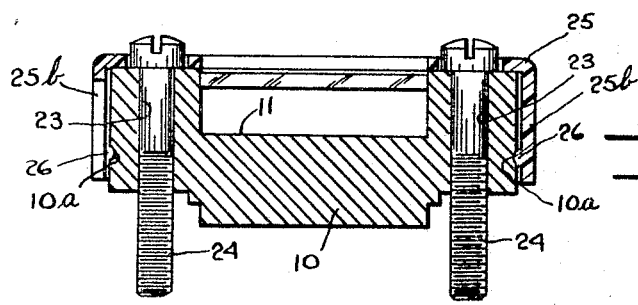
FIG. 2 is a sectional side view of the gauge head of the gauge shown in FIG. 1 in combination with an embodiment of the invention.
Figure 3:
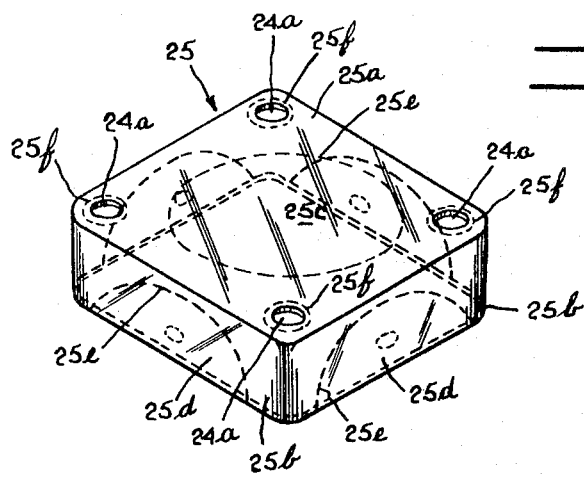
FIG. 3 is a perspective view of the form of invention shown in FIG. 1 and FIG. 2.
Figure 4:
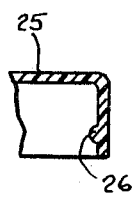
FIG. 4 is a fragmentary, sectional view showing the means for connecting the cover to the gauge head.

The form of gauge head cover shown in FIG. 1 is therein designed generally at 25 and is shown in detail in FIGS. 2 through 4.

Said gauge head cover includes a central portion 25a and angled sides 25b and as shown in FIGS. 1 through 4, is preferably comprised of a plastic or similar material and may be made transparent or otherwise depending upon whether it is particularly desired for use during shipment of the liquid level gauge or during painting of the gauge head or use thereof. Said gauge head cover 25, furthermore, is designed such as to fit over the gauge head 10 and the gauge head mounting bolts 24 and is provided with projections 26 in its opposite sides corresponding to the indentures or recesses 10a in the opposite sides of the gauge head 10. Said gauge head cover is retained in position over the gauge head by projections 26 in grooves 10a by the snap-fit of said projections 26 into the indentures 10a in said gauge head. Removal of said cover from the gauge head is accomplished by the pulling of said projections out of engagement; and installation thereof is performed by the forcing of said projections into engagement with the indentures 10a in the sides of gauge head 10.

Central portion 25a has a removable portion 25c over the gauge dial or face 11 and the side portions 25b have removable portions 25d. The portions 25c and 25d are provided with perforated or scored outlines 25e and similar outlines 25f are provided surrounding openings 24a which allow tearing of the cover along the scored lines facilitate removal of portion 25c for viewing the dial or face 11 and by removal of portions 25d, the cover 25 may be removed.

As an alternative form of construction, forms of engagement of said gauge head 10 and said gauge head cover 25 other than said co-mating projections and indentures could be utilized providing that said rapid and simple attachment and detachment of said members is still maintained.

From the foregoing it will be seen that the gauge head cover 25 illustrated in FIGS. 1 through 4 affords a protective covering to the gauge head 10, maintains the gauge head mounting bolts 24 in their mounting position, is readily and speedily attachable to and detachable from the gauge head 10, yet permits ready and easy access to said mounting bolts 24.

In the installation of the cover upon a gauge head, said cover is slipped over said gauge head and secured thereon either by means of projections 26 in recesses 10a and the gauge head mounting bolts are pushed through the corresponding openings in the gauge head 10, respectively, and are screwed therein.

Removal of the cover 27 from the gauge head 10 may be accomplished by the simple process of breaking away the cover from said head 10 by tearing away portions 25d or lines 25e and, thus, does not necessitate the removal or disturbance of the mounting bolts 24.

It will be understood that, although the openings or holes in the cover 25 have been illustrated as being larger than the heads of bolts 24, said openings or holes may be otherwise constructed providing that they are so constructed such as that their edges function such as to retain the mounting bolts 24 by their spring-back action against the bolt threads.

It will, further, be understood that, although the gauge head cover of the present invention has been hereinbefore described and illustrated with reference to a specific embodiment of a liquid level gauge, such has been done for the purposes of illustration only.

The operation of the invention is believed to be apparent from the foregoing.

From the foregoing it will be seen that we have provided new and improved means for accomplishing all of the objects of the invention.

We claim:

1. A protective cover for the gauge head of a liquid level gauge or the like, said cover having a central portion adapted to be positioned over the gauge dial and having side portions inclined relative to said central portion and adapted to overlie side portions of said gauge head to retain said protective cover on said gauge head, said cover having a scored removable portion which is removable by tearing away, and fastening means on certain of said side portions to connect said cover to the gauge head and carried by scored removable portions on said side portions whereby said cover may be disconnected from said gauge head by tearing away said scored removable sections on said side portions.

2. A protective cover for the gauge head of a liquid level gauge or the like, said cover having a central portion adapted to be positioned over the gauge dial and having side portions inclined relative to said central portion and adapted to overlie side portions of said gauge head to retain said protective cover on said gauge head, said cover having a scored removable portion which is removable by tearing away, and fastening means on certain of said side portions to connect said cover to the gauge head and carried by scored removable portions on said side portions whereby said cover may be disconnected from said gauge head by tearing away said scored removable sections on said side portions, said cover being scored removable portions adjacent the bolts for the gauge head.

References Cited by the Examiner

UNITED STATES PATENTS

| | | | |
|---|---|---|---|
| 2,008,104 | 7/1935 | Juvinall | 317—105 X |
| 2,324,791 | 7/1943 | McLoughlin et al. | 220—3.8 X |
| 2,473,581 | 6/1949 | Ford | 73—317 X |
| 2,612,132 | 9/1952 | Triplett | 324—156 X |

DAVID SCHONBERG, *Primary Examiner.*

LOUIS R. PRINCE, *Examiner.*

D. M. YASICH, *Assistant Examiner.*